US012684023B2

(12) United States Patent
Tao

(10) Patent No.: US 12,684,023 B2
(45) Date of Patent: Jul. 14, 2026

(54) SESSION MANAGEMENT FUNCTION ENTITY DISCOVERY METHOD, NETWORK FUNCTION NODE, ACCESS AND MOBILITY MANAGEMENT FUNCTION ENTITY, ELECTRONIC DEVICE, AND COMPUTER READABLE STORAGE MEDIUM

(71) Applicant: ZTE CORPORATION, Shenzhen (CN)

(72) Inventor: Wangsheng Tao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 144 days.

(21) Appl. No.: 18/575,856

(22) PCT Filed: Jul. 1, 2022

(86) PCT No.: PCT/CN2022/103315
§ 371 (c)(1),
(2) Date: Dec. 31, 2023

(87) PCT Pub. No.: WO2023/280066
PCT Pub. Date: Jan. 12, 2023

(65) Prior Publication Data
US 2024/0372899 A1     Nov. 7, 2024

(30) Foreign Application Priority Data
Jul. 6, 2021     (CN) .......................... 202110760119.9

(51) Int. Cl.
*H04L 65/1069*     (2022.01)
*H04L 67/51*     (2022.01)
*H04W 48/18*     (2009.01)

(52) U.S. Cl.
CPC .......... *H04L 65/1069* (2013.01); *H04L 67/51* (2022.05); *H04W 48/18* (2013.01)

(58) Field of Classification Search
CPC . H04L 65/1069; H04L 67/51; H04L 12/4679; H04L 12/46; H04W 48/18;
(Continued)

(56) References Cited

U.S. PATENT DOCUMENTS

2020/0120022 A1* 4/2020 Stammers ........... H04L 12/4633
2020/0228936 A1 7/2020 Talebi Fard
(Continued)

FOREIGN PATENT DOCUMENTS

CN          108462735  A     8/2018
CN          109673037  A     4/2019
(Continued)

OTHER PUBLICATIONS

European Patent Office, EP22836817.1 Extended European Search Report issued on Jun. 25, 2025.
(Continued)

*Primary Examiner* — Tonia L Dollinger
*Assistant Examiner* — Mehulkumar J Shah
(74) *Attorney, Agent, or Firm* — Li & Cai Intellectual Property (USA) Office

(57)     ABSTRACT

The present disclosure provides a session management function entity discovery method, applied in a session creation process, including: in response to receiving a first request message sent by an access and mobility management function entity (AMF), determining a session management function entity (SMF) set including an SMF that a virtual network (VN) group belongs to, with the VN group including a user equipment (UE) accessing the AMF and requesting to create a session; and determining a preferred SMF of the VN group from the SMF set, and sending information of the preferred SMF to the AMF. The present disclosure further provides a network function node, an access and
(Continued)

mobility management function entity, an electronic device, and a computer-readable storage medium.

8 Claims, 7 Drawing Sheets

(58) Field of Classification Search
CPC ..... H04W 80/10; H04W 76/12; H04W 76/11; H04W 88/14; H04W 40/02; H04W 76/10; H04W 24/04; H04W 28/084; H04W 92/24; H04W 36/12; H04W 76/18
See application file for complete search history.

(56) References Cited

U.S. PATENT DOCUMENTS

| | | | | |
|---|---|---|---|---|
| 2020/0351984 | A1* | 11/2020 | Talebi Fard | ............ H04W 4/08 |
| 2020/0374352 | A1* | 11/2020 | Ge | ......................... H04L 67/146 |
| 2020/0412842 | A1 | 12/2020 | Park | |
| 2021/0274323 | A1* | 9/2021 | Xu | .......................... H04W 4/08 |
| 2022/0030069 | A1* | 1/2022 | Yao | ....................... H04W 76/22 |
| 2022/0167450 | A1* | 5/2022 | Sedlacek | ............... H04W 76/30 |

FOREIGN PATENT DOCUMENTS

| | | | |
|---|---|---|---|
| CN | 111083718 | A | 4/2020 |
| CN | 111917563 | A | 11/2020 |
| CN | 113260010 | A | 8/2021 |
| WO | 2021094025 | A1 | 5/2021 |
| WO | WO2021094025 | A | 5/2021 |

OTHER PUBLICATIONS

Huawei, et al., "5GLAN communication", 3GPP Draft, vol. SA WG2, No. Santa Cruz, Tenerife, ES; Feb. 19, 2019.
Samsung: "Updating the SMF context procedure", 3GPP TSG-SA2 WG2 Meeting#134 S2-1907663, Jun. 18, 2019.
Nokia: "Dedicated SMF selection for a 5G LAN group", 3GPP TSG-SA WG2 Meeting#133 S2-1905434, May 7, 2019.
WIPO, International Search Report issued on Oct. 10, 2022.
China Patent Office, First Office Action issued Aug. 20, 2021 for application No. CN202110760119.9.
China Patent Office, Notification of grant issued Sep. 10, 2021 for application No. CN202110760119.9.

* cited by examiner

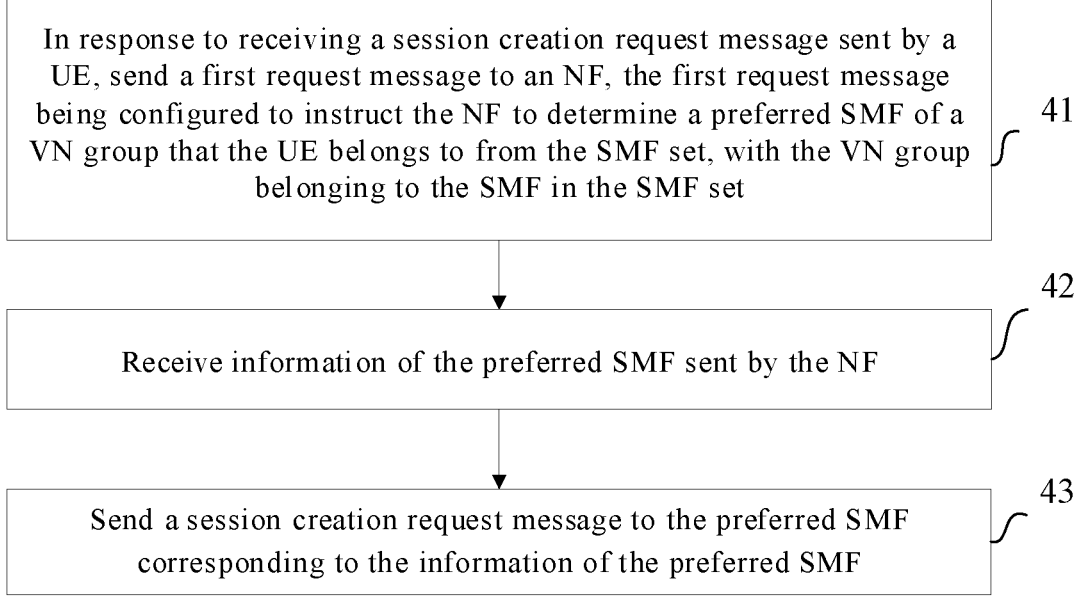

In response to receiving a session creation request message sent by a
UE, send a first request message to an NF, the first request message
being configured to instruct the NF to determine a preferred SMF of a
VN group that the UE belongs to from the SMF set, with the VN group
belonging to the SMF in the SMF set     41

Receive information of the preferred SMF sent by the NF     42

Send a session creation request message to the preferred SMF
corresponding to the information of the preferred SMF     43

FIG. 5

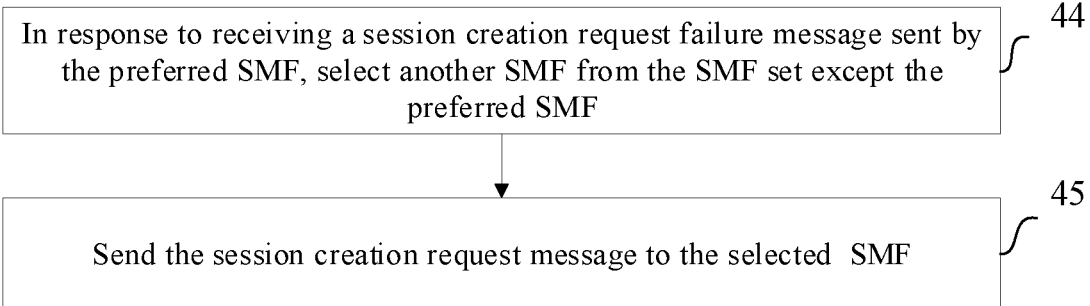

In response to receiving a session creation request failure message sent by
the preferred SMF, select another SMF from the SMF set except the
preferred SMF     44

Send the session creation request message to the selected SMF     45

FIG. 6

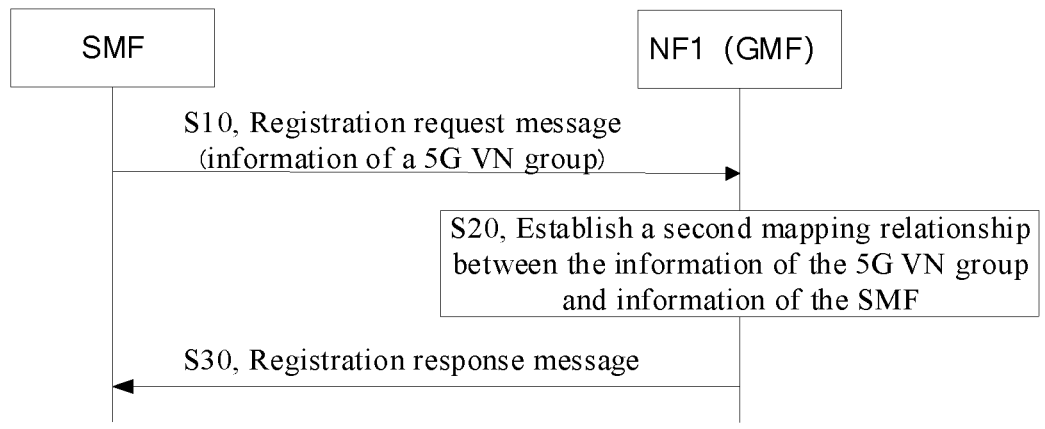
FIG. 9
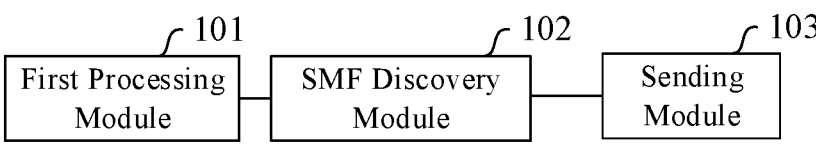
FIG. 10
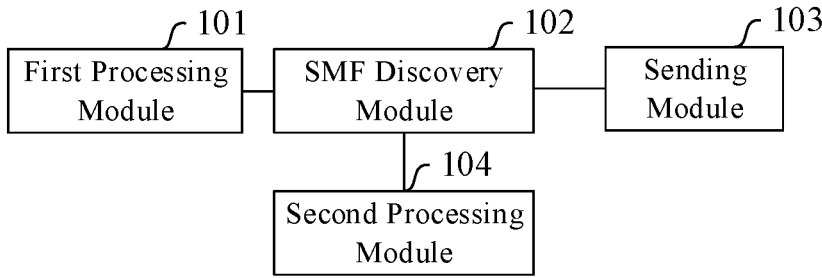
FIG. 11
FIG. 12

SESSION MANAGEMENT FUNCTION ENTITY DISCOVERY METHOD, NETWORK FUNCTION NODE, ACCESS AND MOBILITY MANAGEMENT FUNCTION ENTITY, ELECTRONIC DEVICE, AND COMPUTER READABLE STORAGE MEDIUM

CROSS-REFERENCE TO RELATED APPLICATIONS

The present disclosure is a National Phase Application filed under 35 U.S.C. 371 as a national stage of PCT/CN2022/103315 filed on Jul. 1, 2022, and claims the priority of Chinese Patent Application No. 202110760119.9, filed on Jul. 6, 2021, the contents of which are incorporated herein in their entirety by reference.

TECHNICAL FIELD

The present disclosure relates to the field of communications technologies, and in particular, to a session management function entity discovery method, a network function node, an access and mobility management function entity, an electronic device, and a computer-readable storage medium.

BACKGROUND

The third generation partnership project (3GPP) R16 introduces services supporting a 5G (5th generation mobile communications) local area network (LAN) to provide services similar to private communications of an area network. Users under each 5G LAN form a 5G virtual network (VN) group, and each 5G VN group is provided with a 5G VN group ID.

The existing 3GPP standard specifies that each 5G VN group only belongs to one session management function entity (SMF), but such limitation may cause the reliability of communications to be reduced, for example, if the SMF that the 5G VN group belongs to fails, the users in the 5G VN group cannot communicate, and in order to ensure availability of the 5G LAN, each 5G VN group may belong to a plurality of SMFs in actual deployment. However, if each 5G VN group belongs to a plurality of SMFs, user equipments (UEs) of parties communicating with each other perform data routing and forwarding through two different anchor user plane function entities (A-UPFs), resulting in a relatively large delay and a relatively large network load.

SUMMARY

In an aspect, an embodiment of the present disclosure provides a session management function entity (SMF) discovery method, applied in a session creation process, including: in response to receiving a first request message sent by an access and mobility management function entity (AMF), determining an SMF set including an SMF that a VN group belongs to, with the VN group including a user equipment (UE) accessing the AMF and requesting to create a session; determining the preferred SMF of the VN group from the SMF set; and sending information of the preferred SMF to the AMF.

In an aspect, an embodiment of the present disclosure provides an SMF discovery method, applied in a session creation process, including: in response to receiving an SMF discovery request message sent by an AMF, acquiring information of a VN group carried in the SMF discovery request message; determining an SMF set of the VN group according to the information of the VN group according to the information of the VN group and a second mapping relationship between the information of the VN group and information of an SMF; and sending an SMF discovery response message carrying the SMF set to the AMF, so that the AMF initiates a request for selecting the preferred SMF.

In an aspect, an embodiment of the present disclosure provides an SMF discovery method, including: in response to receiving a session creation request message sent by a UE, sending a first request message to a network function node (NF), the first request message being configured to instruct the NF to determine a preferred SMF of a VN group that the UE belongs to from an SMF set, the VN group belonging to the SMF in the SMF set; receiving information of the preferred SMF sent by the NF; and sending a session creation request message to the preferred SMF corresponding to the information of the preferred SMF.

In an aspect, an embodiment of the present disclosure provides a network function node, including: a first processing module, an SMF discovery module, and a sending module, the first processing module is configured to receive a first request message sent by an AMF, determine an SMF set including an SMF that a VN group belongs to, with the VN group including a UE accessing the AMF and requesting to create a session; the SMF discovery module is configured to determine the preferred SMF of the VN group from the SMF set; and the sending module is configured to send information of the preferred SMF to the AMF.

In an aspect, an embodiment of the present disclosure provides a network function node, including: a receiving module, an acquiring module, a processing module, and a sending module, the receiving module is configured to receive an SMF discovery request message sent by an AMF; the acquiring module is configured to acquire information of a VN group carried in the SMF discovery request message; the processing module is configured to determine an SMF set of the VN group according to the information of the VN group and a second mapping relationship between the information of the VN group and information of an SMF; and the sending module is configured to send an SMF discovery response message carrying the AMF set to the AMF, so that the AMF initiates a request for selecting the preferred SMF.

In an aspect, an embodiment of the present disclosure provides an access and mobility management function entity, including an SMF discovery module configured to: send a first request message to an NF in response to receiving a session creation request message sent by a UE, the first request message being configured to instruct the NF to determine a preferred SMF of a VN group that the UE belongs to from an SMF set, the VN group belonging to the SMF in the SMF set; receive information of the preferred SMF sent by the NF, and send the session creation request message to the preferred SMF corresponding to the information of the preferred SMF.

In an aspect, the present disclosure provides an electronic device, including: at least one processor; and a storage device having at least one computer program stored thereon; the at least one computer program, executed by the at least one processor, causes the at least one processor to implement the SMF discovery method described above.

In an aspect, the present disclosure provides a computer-readable storage medium having a computer program stored thereon, the computer program, executed by a processor, causes the processor to perform the SMF discovery method described above.

BRIEF DESCRIPTION OF DRAWINGS

FIG. 5 is a schematic flowchart illustrating an SMF discovery method performed by an access and mobility management function entity (AMF) according to the present disclosure;

FIG. 6 is a schematic flowchart illustrating that an AMF re-initiates a session creation request according to the present disclosure;

FIG. 9 is a schematic flowchart of signaling for an SMF registering to an NF deployed with a GMF according to the present disclosure;

FIGS. 10 to 12 are schematic structural diagrams of NFs according to the present disclosure;

DETAIL DESCRIPTION OF EMBODIMENTS

Exemplary implementations/embodiments are described in detail below with reference to the accompanying drawings, but the present disclosure may be implemented/embodied in different forms, and should not be construed as limited to the implementations/embodiments set forth herein. The implementations/embodiments are illustrated to make the present disclosure more thorough and complete, and for those skilled in the art more fully understanding the scope of the present disclosure.

As used herein, a term "and/or" includes any and all combinations of at least one of listed items.

The terms used in the present disclosure are for a purpose of describing particular implementations/embodiments only, and are not intended to limit the present disclosure. As used in the present disclosure, singular forms "a" and "the" are intended to include plural forms as well, i.e., to represent at least one, unless the context clearly defines otherwise. It should further be understood that terms "includes/comprises" and/or "made of/consisted of" in the present disclosure are used to specify a presence of at least one of recited features, integers, steps, operations, elements or components, but do not preclude a presence or an addition of at least one of other features, integers, steps, operations, elements, components or groups thereof.

The implementations/embodiments of the present disclosure may be described with reference to plan and/or crosssectional views with the help of idealized schematic illustrations of the present disclosure. Therefore, the example illustrations may be modified in accordance with manufacturing techniques and/or tolerances. The implementations/embodiments of the present disclosure are not limited to those shown in the accompanying drawings, but include modifications of any configuration formed based on a manufacturing process. Therefore, areas illustrated in the accompanying drawings have schematic properties, and shapes of the areas illustrated in the accompanying drawings illustrate specific shapes of the areas of elements, but are not limiting.

Unless otherwise defined, meanings of all terms (including technical terms and scientific terms) used herein are the same as meanings commonly understood by one of ordinary skill in the art. It should further be understood that terms, such as those defined in common dictionaries, should be construed as having a meaning that is consistent with that in background of the existing art and the present disclosure, and should not be construed as having an idealized or over-formal meaning, unless expressly defined in the present disclosure.

Figure 1A:
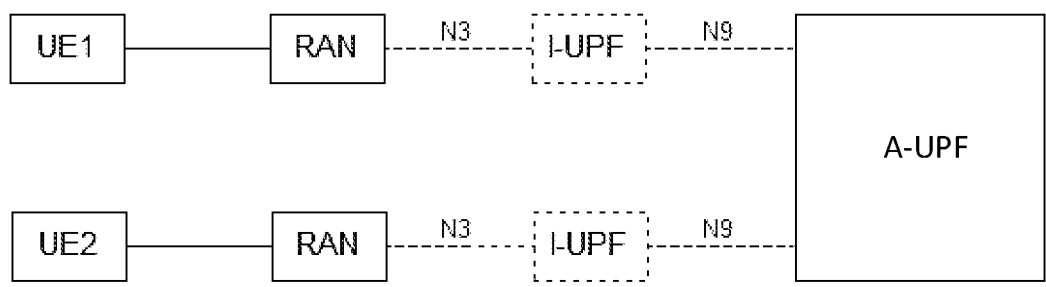
FIGS. 1a to 1c are schematic diagrams illustrating three ways of data routing and forwarding between user equipments in a 5G LAN according to the present disclosure.
Figure 1B:
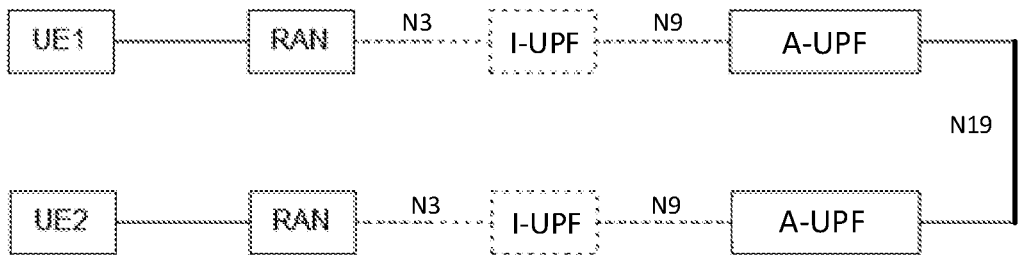
Figure 1C:
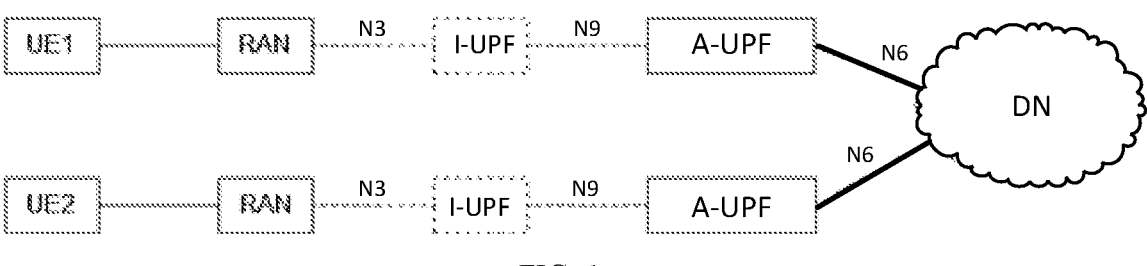

For each 5G VN group, communication data between users may be locally routed through an A-UPF, or routed through an N19 interface between two A-UPFs, or routed through a DN (Data Network) based on an N6 interface between two A-UPFs, which depends on a relationship between UEs of two communication parties and the A-UPF (s). As shown in FIG. 1a, if two communication parties (UE1 and UE2) belong to one A-UPF, the A-UPF directly performs local routing to forward the data; as shown in FIG. 1b, if two communication parties (UE1 and UE2) belong to different A-UPFs and the A-UPFs support the N19 interface, the data is routed and forwarded based on the N19 interface; as shown in FIG. 1c, if two communication parties (UE1 and UE2) belong to different A-UPFs and the A-UPFs do not support the N19 interface, the data is routed and forwarded through the DN based on the N6 interface.

It can be seen from the above three architectures for routing the communication data in the 5G LAN that, the local routing based on the A-UPF requires no additional N19 or N6 interface for routing and forwarding the data, resulting in a relatively low transmission delay, and a relatively low network load. Based on such characteristics, the 3GPP standard specifies that protocol data unit (PDU) sessions of users in each 5G VN group belongs to one SMF, and for the PDU sessions in each 5G VN group, the SMF selects one A-UPF as much as possible. However, such limitation may reduce the reliability of communication, and if the SMF that the 5G VN group belongs to fails, the users in the 5G VN group cannot communicate, therefore, in order to ensure the reliability of a 5G LAN network, each 5G VN group may belong to a plurality of SMFs in actual deployment. But the existing 3GPP standard cannot guarantee that PDU sessions in each 5G VN group select one SMF, and thus cannot utilize advantages of the local routing in a 5G LAN service.

An embodiment of the present disclosure provides an SMF discovery method, in which, in a case where each 5G VN group belongs to a plurality of SMFs, during the users in the 5G VN group creating PDU sessions, an AMF selects one SMF to access as much as possible, i.e., the AMF selects one SMF for the PDU sessions in each 5G VN group. In the embodiment of the present disclosure, a creation of a PDU session in a 5G scenario is illustrated as an example.

Figure 2:
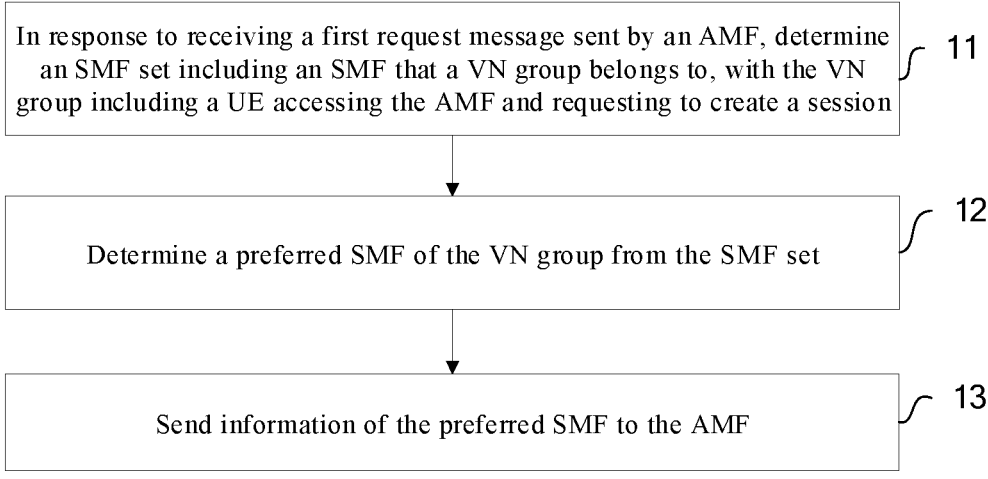
FIG. 2 is a schematic flowchart illustrating an SMF discovery method performed by a network function node (NF) according to the present disclosure.

As shown in FIG. 2, an SMF discovery method provided in the embodiment of the present disclosure is applied in a session creation process for creating a session, and includes operations 11 to 13.

At operation 11, in response to receiving a first request message sent by an AMF, determining an SMF set including an SMF that a VN group belongs to, with the VN group including a UE accessing the AMF and requesting to create a session.

Each VN group includes a plurality of UEs, if a PDU session is to be performed between the UEs in one VN group, the UEs are to be registered in an AMF first, the UEs in the VN group may be registered in one AMF or different AMFs, and the UEs can create the PDU session only after the UEs are registered in the AMF(s). After the UEs are registered in the AMF(s), if any UE in the VN group is to communicate with another UE in the VN group, the UE sends a PDU session creation request message to the AMF that the UE is registered therein, and after receiving the PDU session creation request message, the AMF sends the first request message to an NF.

In operation 11, the NF receives the first request message sent by the AMF, and determines the SMF set according to the first request message. The SMF set includes at least two SMFs that the VN group belongs to, with the VN group including the UE accessing the AMF and requesting to create the session.

A GMF is used to manage information of the VN Group, and a group preferred SMF selection function entity (GPSSF) is used to select a preferred SMF from a group of SMFs (i.e., the SMF set) that the VN group belongs to. It should be noted that the GMF and the GPSSF may be separately deployed in different NFs, or the GMF and the GPSSF may be deployed in one NF simultaneously, and the GMF and the GPSSF may be implemented as a functional component of the existing NF, or may be implemented as a new NF. If the NFs are of different types and have different configurations of functions, first request messages corresponding to the NFs are also different, and the first request messages and processing flows for the first request messages are described in detail subsequently for different types and different configurations of functions of the NFs.

At operation 12, determining the preferred SMF of the VN group from the SMF set.

In operation 12, the NF determines the preferred SMF of the VN group from the SMF set. The preferred SMF refers to an SMF that the AMF is to access in priority or first, and for the PDU session initiated by the UE in the VN group, the AMF is to access the preferred SMF in priority or first, and initiates a PDU session creation request to the preferred SMF. It should be noted that the preferred SMF, if determined, is usually not to be changed unless the preferred SMF fails, so as to ensure that the AMF selects one SMF to access for the PDU sessions of each 5G VN group.

At operation 13, sending information of the preferred SMF to the AMF.

In operation 13, if the NFs are of different types and have different configurations of functions, the information of the preferred SMF determined in operation 12 is sent to the AMF through different messages, so that the AMF accesses the preferred SMF to create the PDU session.

The embodiment of the present disclosure provides the SMF discovery method applied in the session creation process, in which, in response to receiving the first request message sent by the AMF, the SMF set including the SMF that the VN group belongs to is determined, with the VN group including the UE accessing the AMF and requesting to create the session; the preferred SMF of the VN group is determined from the SMF set, and the information of the preferred SMF is sent to the AMF; in the SMF discovery method provided in the embodiment of the present disclosure, one preferred SMF is selected from the SMF set that the VN group including the UE belongs to, and during creating a session, the AMF accesses the preferred SMF and initiates the session creation request, so that no matter the UEs in the VN group access one AMF or different AMFs, the AMF(s) can be ensured to access one SMF as much as possible, i.e., local routing and forwarding can be directly performed through the A-UPF between the UEs in each VN group, and on a premise of ensuring the reliability of network communication, the communication delay is reduced and the network load is reduced.

In some implementations, the SMF discovery method further includes following operation: after receiving the first request message sent by the AMF, and before determining the preferred SMF of the VN group, acquiring information of the VN group carried in the first request message.

In some implementations, the determining the preferred SMF of the VN group (i.e., the operation 12) includes following operations: in response to that the preferred SMF corresponding to the information of the VN group is determined according to a first mapping relationship between the information of the VN group and the information of the preferred SMF, taking the determined preferred SMF as the preferred SMF of the VN group; in response to that the preferred SMF corresponding to the information of the VN group is not determined according to the first mapping relationship between the information of the VN group and the information of the preferred SMF, selecting one SMF from the SMF set as the preferred SMF of the VN group.

The first mapping relationship between the information of the VN group and the information of the preferred SMF is stored in the NF, if the preferred SMF can be determined according to the first mapping relationship, it indicates that the NF selected the preferred SMF for the VN group once (i.e., the preferred SMF of the VN group already exists), in the PDU session creation process, if it is founded that the preferred SMF of the VN group already exists in the NF, the preferred SMF is not to be re-determined in the operation 12, but the preferred SMF previously determined is to be used as the preferred SMF of the VN group; if it is found that there is no preferred SMF for the VN group in the NF, then in the operation 12, the preferred SMF is to be determined, i.e., one SMF is to be selected from the SMF set as the preferred SMF of the VN group.

In some implementations, the selecting one SMF from the SMF set as the preferred SMF of the VN group includes following operation: taking the pre-designated SMF in the SMF set as the preferred SMF of the VN group, or randomly selecting one SMF from the SMF set as the preferred SMF of the VN group. That is, the preferred SMF may be determined by a manner of being statically configured, or may be determined by a manner of being dynamically selected. In the manner of being statically configured, one SMF in the SMF set may be pre-designated as the preferred SMF by using a configuration file or a configuration parameter; and in the manner of being dynamically selected, one SMF may be randomly selected from the SMF set as the preferred SMF.

In order to ensure that the AMF selects one SMF for the PDU sessions of each 5G VN group, after the preferred SMF of the VN group is determined for the first time, the information of the preferred SMF is to be recorded in the NF. Therefore, in some implementations, the SMF discovery method further includes following operation: after selecting one SMF from the SMF set as the preferred SMF of the VN group, establishing the first mapping relationship between the information of the VN group and the information of the preferred SMF. By establishing the first mapping relationship between the information of the VN group and the information of the preferred SMF, whether the preferred SMF corresponding to the VN group exists in the NF can be determined by searching for the first mapping relationship, if the first mapping relationship is searched, the information of the preferred SMF can be directly obtained, if the first mapping relationship is not searched, the preferred SMF is to be selected for the VN group, the preferred SMF is not to be selected every time, thereby the processing of the NF is simplified, and the preferred SMF is ensured not to be changed.

For NFs of different types and having different configurations of functions, the first request messages and processes of determining the SMF set are described below respectively.

In some implementations, both the GMF and the GPSSF are deployed in the NF, the first request message is an SMF discovery request message, and the SMF discovery method further includes following operation: after receiving the first request message sent by the AMF, acquiring information of the VN group carried in the SMF discovery request message. In some implementations, the determining the SMF set includes: determining the SMF set of the VN group according to the information of the VN group and a second mapping relationship between the information of the VN group and information of an SMF. Since the information of the VN group and the second mapping relationship between the information of the VN group and information of the SMF are recorded in the GMF, in the process of determining the SMF set, information of all SMFs corresponding to the VN group can be determined according to the second mapping relationship, so as to obtain the SMF set.

In some implementations, the SMF discovery request message may further carry at least one of followings: location information of the UE, a data network name (DNN), and information of a network slice. During determining the SMF set, the information of the VN group may be combined with at least one of the above information carried in the SMF discovery request message to be used as factors for determining the SMF set.

In a case where both the GMF and the GPSSF are deployed in the NF, in some implementations, the sending information of the preferred SMF to the AMF (i.e., the operation 13) includes: sending an SMF discovery response message to the AMF, the SMF discovery response message carrying the information of the preferred SMF. In this operation, the NF deployed with the GMF and the GPSSF returns the SMF discovery response message to the AMF, and the SMF discovery response message carries the information of the preferred SMF.

In some implementations, the SMF discovery response message may further carry the SMF set, so that if the AMF fails to initiate the PDU session creation request to the preferred SMF subsequently, the AMF can select another SMF from the SMF set to reinitiate the PDU session creation request.

In some implementations, the GMF and the GPSSF are respectively deployed in different NFs, and the first request message is a VN group preferred SMF selection request message for requesting to select the preferred SMF for the VN group, the determining an SMF set includes: acquiring the SMF set, carried in the VN group preferred SMF selection request message, determined by the GMF according to the information of the VN group carried in the SMF discovery request message sent by the AMF and the second mapping relationship between the information of the VN group and information of the SMF, and sending the SMF set to the AMF. That is, in a case where the GMF and the GPSSF are respectively deployed in different NFs, the AMF first sends the SMF discovery request message carrying the information of the VN group to the NF (for example. NF1) where the GMF is deployed, and the NF1 determines the SMF set corresponding to the information of the VN group according to the second mapping relationship between the information of the VN group and the information of the SMF, and returns the SMF discovery response message carrying the SMF set to the AMF. The AMF sends the VN group preferred SMF selection request message carrying the SMF set to the NF (for example, NF2) where the GPSSF is deployed, the NF2 directly obtains the SMF set from the VN group preferred SMF selection request message.

In the case where the GMF and the GPSSF are respectively deployed in different NFs, in some implementations, the sending information of the preferred SMF to the AMF (i.e., the operation 13) includes: sending a VN group preferred SMF selection response message, for responding to the VN group preferred SMF selection request message, carrying the information of the preferred SMF to the AMF. In this operation, the NF2 where the GPSSF is deployed returns the VN group preferred SMF selection response message carrying the information of the preferred SMF to the AMF.

In some implementations, the SMF discovery method further includes an operation of establishing the second mapping relationship between the information of the VN group and the information of the SMF, and the second mapping relationship is established during the SMF being registered, and a process for establishing the second mapping relationship between the information of the VN group and the information of the SMF is described in detail below with reference to FIG. 3.

Figure 3:
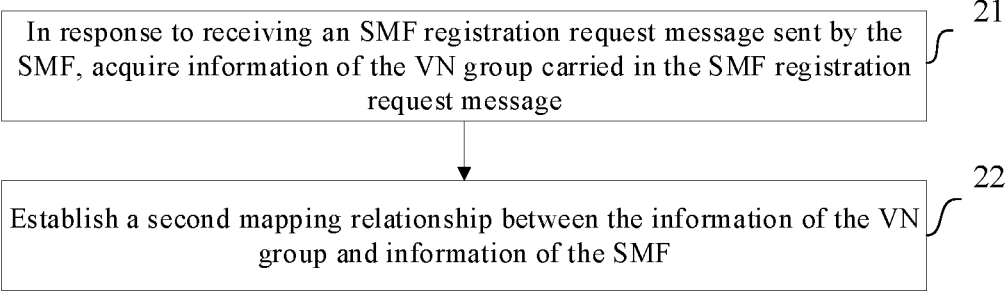
FIG. 3 is a schematic flowchart illustrating a registration of an SMF according to the present disclosure.

As shown in FIG. 3, the establishing the second mapping relationship between the information of the VN group and the information of the SMF includes following operations 21 and 22.

At operation 21, in response to receiving an SMF registration request message sent by the SMF, acquiring information of the VN group carried in the SMF registration request message.

In this operation, the SMF sends the SMF registration request message to the NF (may be the NF where the GMF is deployed alone, or the NF where both the GMF and the GPSSF are deployed) where the GMF is deployed, so as to implement the registration of the SMF, and the SMF registration request message carries the information of the VN group corresponding to the SMF.

At operation 22, establishing the second mapping relationship between the information of the VN group and the information of the SMF.

In this operation, for the SMF currently registered, the NF where the GMF is deployed establishes the second mapping relationship between the information of the VN group and the information of the SMF, and stores the second mapping relationship locally. It should be noted that each SMF registers to the NF where the GMF is deployed, so that the NF where the GMF is deployed can establish and store the second mapping relationship between the information of the SMF and the information of the VN group corresponding thereto, in such way, during the SMF set being subsequently determined, the information of all SMFs corresponding to the VN group may be directly found according to the information of the VN group and the second mapping relationship, so that the SMF set is obtained.

In some implementations, the SMF discovery method further includes following operation: after establishing the second mapping relationship between the information of the VN group and the information of the SMF (i.e., the operation 22), returning a registration response message to the SMF.

Figure 4:
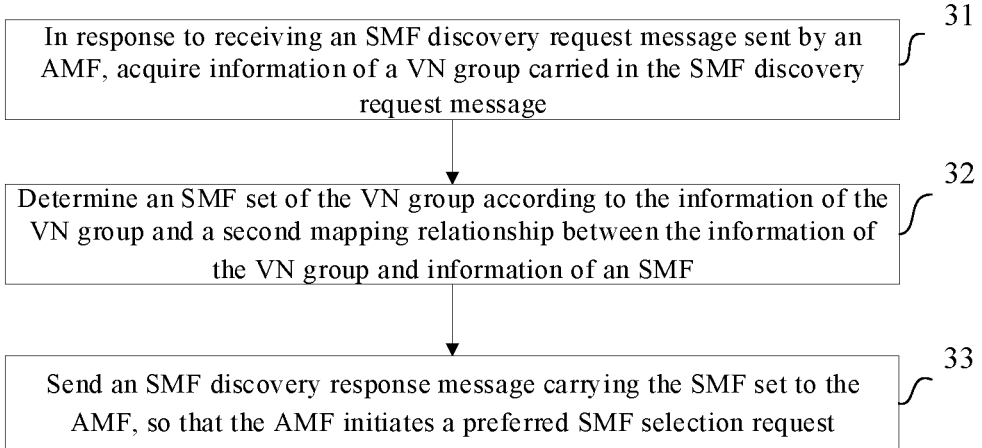
FIG. 4 is a schematic flowchart illustrating an SMF discovery method performed by a group management function entity (GMF) according to the present disclosure.

An embodiment of the present disclosure further provides an SMF discovery method, as shown in FIG. 4, including following operations 31 to 33.

At operation 31, in response to receiving an SMF discovery request message sent by an AMF, acquiring information of a VN group carried in the SMF discovery request message.

In this operation, an NF where the GMF is deployed receives the SMF discovery request message sent by the AMF, and acquires the information of the VN group carried in the SMF discovery request message.

At operation 32, determining an SMF set of the VN group according to the information of the VN group and a second mapping relationship between the information of the VN group and information of an SMF.

Since the information of the VN group and the second mapping relationship between the information of the VN group and the information of the SMF are recorded in the NF where the GMF is deployed, in this operation, information of all SMFs corresponding to the VN group can be determined according to the second mapping relationship to obtain the SMF set.

At operation 33, sending an SMF discovery response message carrying the SMF set to the AMF, so that the AMF initiates a preferred SMF selection request.

The embodiment of the present disclosure provides the SMF discovery method applied in the session creation process, in which, in response to receiving the SMF discovery request message sent by the AMF, the information of the VN group carried in the SMF discovery request message is acquired; the SMF set of the VN group is determined according to the information of the VN group and the second mapping relationship between the information of the VN group and the information of the SMF; the SMF discovery response message carrying the SMF set is sent to the AMF, so that the AMF initiates the preferred SMF selection request. In the SMF discovery method provided in the embodiment of the present disclosure, one preferred SMF is selected from the SMF set that the VN group including the UE belongs to, and during creating a session, the AMF accesses the preferred SMF and initiates the session creation request, so that no matter the UEs in the VN group access one AMF or different AMFs, the AMF(s) can be ensured to access one SMF as much as possible, i.e., local routing and forwarding can be directly performed through the A-UPF between UEs in each VN group, and on a premise of ensuring the reliability of network communication, the communication delay is reduced and the network load is reduced.

In some implementations, the SMF discovery method further includes an operation of establishing the second mapping relationship between the information of the VN group and the information of the SMF, and the second mapping relationship is established during the SMF being registered, as shown in FIG. 3, the establishing the second mapping relationship between the information of the VN group and the information of the SMF includes following operations 21 and 22.

At operation 21, in response to receiving an SMF registration request message sent by the SMF, acquiring information of the VN group carried in the SMF registration request message.

In this operation, the SMF sends the SMF registration request message to the NF (may be the NF where the GMF is deployed alone, or the NF where both the GMF and the GPSSF are deployed) where the GMF is deployed, so as to implement the registration of the SMF, and the SMF registration request message carries the information of the VN group corresponding to the SMF.

At operation 22, establishing the second mapping relationship between the information of the VN group and the information of the SMF.

In this operation, for the SMF currently registered, the NF where the GMF is deployed establishes the second mapping relationship between the information of the VN group and the information of the SMF, and stores the second mapping relationship locally. It should be noted that each SMF registers to the NF where the GMF is deployed, so that the NF where the GMF is deployed can establish and store the second mapping relationship between the information of the SMF and the information of the VN group corresponding thereto, in such way, during the SMF set being subsequently determined, the information of all SMFs corresponding to the VN group may be directly found according to the information of the VN group and the second mapping relationship, so that the SMF set is obtained.

In some implementations, the SMF discovery method further includes following operation: after establishing the second mapping relationship between the information of the VN group and the information of the SMF (i.e., the operation 22), returning a registration response message to the SMF.

An embodiment of the present disclosure further provides an SMF discovery method, as shown in FIG. 5, including following operations 41 to 43.

At operation 41, in response to receiving a session creation request message sent by a UE, sending a first request message to an NF, the first request message being configured to instruct the NF to determine a preferred SMF of a VN group that the UE belongs to from an SMF set, the VN group belonging to the SMF in the SMF set.

Each VN group includes a plurality of UEs, if a PDU session is to be performed between the UEs in one VN group, the UEs are to be registered in an AMF first, the UEs in the VN group may be registered in one AMF or different AMFs, and the UEs can create the PDU session only after the USs are registered in the AMF(s). After the UEs are registered in the AMF(s), if any UE in the VN group is to communicate with another UE in the VN group, the UE sends a PDU session creation request message to the AMF that the UE is registered therein, and after receiving the PDU session creation request message, the AMF sends the first request message to an NF, so that the NF determines the preferred SMF of the VN group that the UE belongs to from the SMF set, and the VN group belongs to the SMF in the SMF set.

If NFs are of different types and have configurations of functions, first request messages corresponding to the NFs are also different, the first request messages and processing flows for the first request messages are described in detail subsequently for different types and configurations of functions of the NFs.

At operation 42, receiving information of the preferred SMF sent by the NF.

In this operation, if the NFs are of different types and have different configurations of functions, the AMF receives, through different messages, the information of the preferred SMF sent by the NFs.

At operation 43, sending a session creation request message to the preferred SMF corresponding to the information of the preferred SMF.

The embodiment of the present disclosure provides the SMF discovery method applied in the session creation process, in which, in response to receiving the session creation request message sent by the user equipment, the first request message is sent to the NF, the first request message is configured to instruct the NF to determine the preferred SMF of the VN group that the UE belongs to from the SMF set, the VN group belongs to the SMF in the SMF set; the information of the preferred SMF sent by the NF is received, and the session creation request message is sent to the preferred SMF corresponding to the information of the preferred SMF; in the SMF discovery method provided in the embodiment of the present disclosure, one preferred SMF is selected from the SMF set that the VN group including the UE belongs to, and during creating a session, the AMF accesses the preferred SMF and initiates the session creation request, so that no matter the UEs in the VN group access one AMF or different AMFs, the AMF(s) can be ensured to access one SMF as much as possible, i.e., local routing and forwarding can be directly performed through the A-UPF between the UEs in each VN group, and on a premise of ensuring the reliability of network communication, the communication delay is reduced and the network load is reduced.

In some implementations, the SMF discovery method further includes following operation: before sending the session creation request message to the preferred SMF corresponding to the information of the preferred SMF (i.e., the operation 43), acquiring the SMF set.

In some implementations, as shown in FIG. 6, after sending the session creation request message to the preferred SMF corresponding to the information of the preferred SMF (i.e., the operation 43), the SMF discovery method further includes following operations 44 and 45.

At operation 44, in response to receiving a session creation request failure message sent by the preferred SMF, selecting another SMF from the SMF set except the preferred SMF.

If the preferred SMF fails to create the PDU session, a PDU session creation request failure message is returned to the AMF, and after receiving the PDU session creation request failure message sent by the preferred SMF, the AMF can select another SMF (i.e., a substitute SMF) from the SMF set except the preferred SMF according to a local strategy and initiate a PDU session creation request to the substitute SMF. The local strategy may be to pre-specify the substitute SMF, or to randomly select the substitute SMF, and it should be noted that the local strategy may also be used to define whether the substitute SMF is to be selected after the preferred SMF fails to create the PDU session.

At operation 45, sending the session creation request message to the selected SMF.

In some implementations, both the GMF and the GPSSF are deployed in the NF, the first request message is an SMF discovery request message carrying information of the VN group that the UE belongs to, the receiving information of the preferred SMF sent by the NF (i.e., the operation 42) and the acquiring the SMF set include following operations: receiving an SMF discovery response message sent by the NF, and acquiring the information of the preferred SMF and the SMF set carried in the SMF discovery response message, the SMF set being determined by the NF according to the information of the VN group and the second mapping relationship between the information of the VN group and the information of the SMF. The GMF in the NF records the information of the VN group and the second mapping relationship between the information of the VN group and the information of the SMF, so that in the process of determining the SMF set, the GMF in the NF can determine the information of all SMFs corresponding to the VN group according to the second mapping relationship, so that the SMF set is obtained.

In some implementations, the GMF and the GPSSF are respectively deployed in different NFs, i.e., the NFs includes a first NF (NF1) and a second NF (NF2), the first NF being the NF1 where the GMF is deployed, the second NF being the NF2 where the GPSSF is deployed. The first request message is a VN group preferred SMF selection request message, the SMF discovery method further includes: before sending the first request message to the NF (i.e., the operation 41), sending the SMF discovery request message carrying the information of the VN group to the first NF, the SMF discovery request message being configured to instruct the first NF to determine the SMF set; and receiving the SMF discovery response message sent by the first NF, and acquiring the SMF set carried in the SMF discovery response message.

In some implementations, the sending a first request message to an NF includes: sending the VN group preferred SMF selection request message carrying the SMF set, the VN group preferred SMF selection request message being configured to instruct the second NF to determine the preferred SMF of the VN group.

That is, in the case where the GMF and the GPSSF are respectively deployed in different NFs, the AMF first sends the SMF discovery request message carrying the information of the VN group to the first NF (NF1) where the GMF is deployed, the first NF (NF1) determines the SMF set corresponding to the information of the VN group according to the second mapping relationship between the information of the VN group and the information of the SMF, and returns the SMF discovery response message carrying the SMF set to the AMF. The AMF sends the VN group preferred SMF selection request message carrying the SMF set to the second NF (NF2) where the GPSSF is deployed, the second NF (NF2) acquires the SMF set carried in the VN group preferred SMF selection request message and determines the preferred SMF of the VN group.

In some implementations, the VN group preferred SMF selection request message carries the information of the VN group, so that the second NF (NF2) can determine, based on the information of the VN group, whether the preferred SMF has ever been determined for the VN group.

Figure 7:
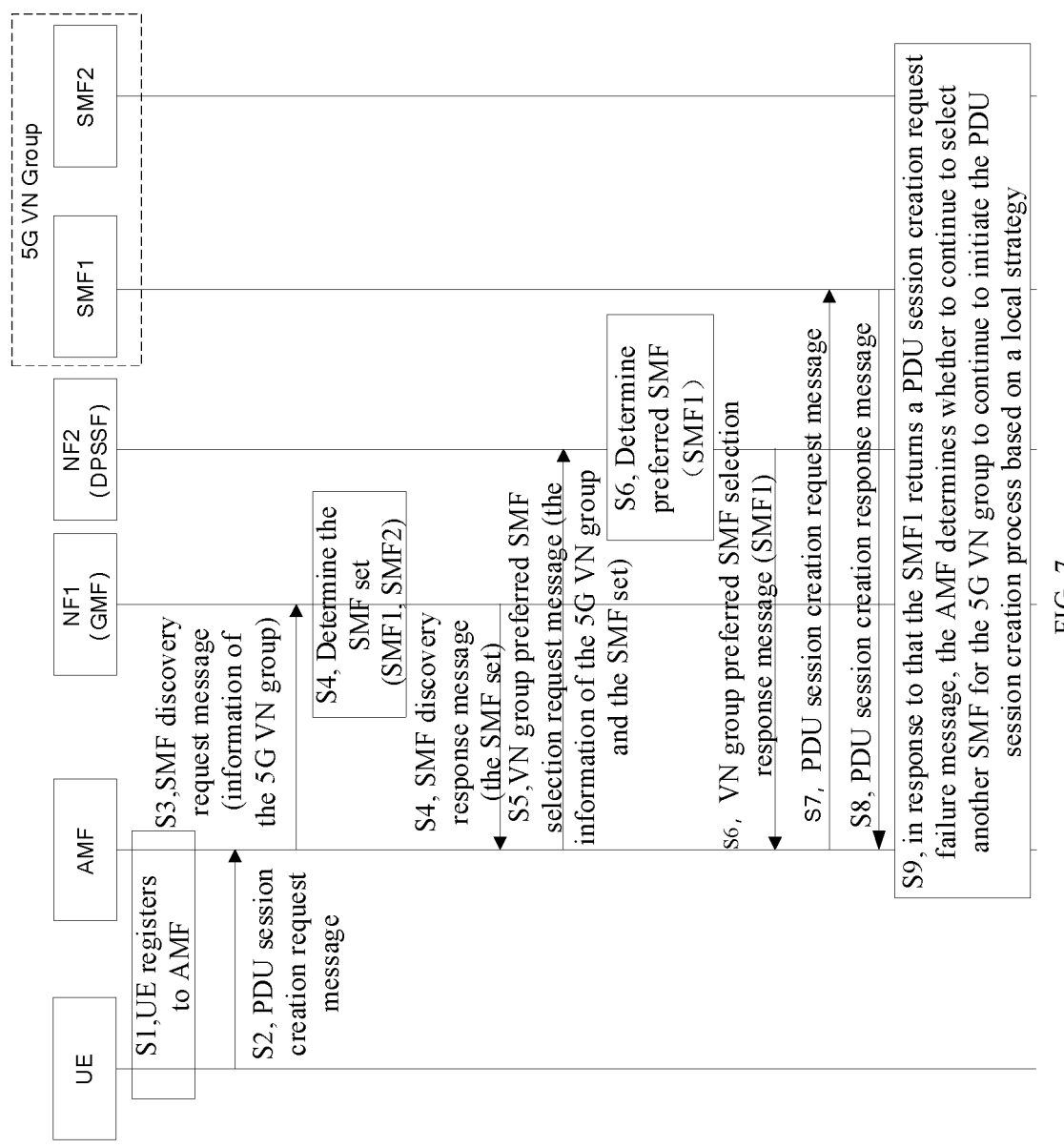
FIG. 7 is a flowchart of signaling in an SMF discovery method in a scenario where a GMF and a group preferred SMF selection function entity (GPSSF) are deployed in different NFs respectively according to the present disclosure.

For clearly describing the solution of the embodiment of the present disclosure, an SMF discovery process in the case where the GMF and the GPSSF are respectively deployed in different NFs is described in detail below by taking an example, in the example, NF1 is the NF where the GMF is deployed alone, NF2 is the NF where the GPSSF is deployed alone, and the SMF set, corresponding to the 5G VN group that the UE belongs to, includes SMF1 and SMF2. As shown in FIG. 7, the SMF discovery process includes following operations S1 to S9.

At operation S1, the UE registers to a 5G core network, i.e., the UE registers to the AMF.

At operation S2, the UE sends a PDU session creation request message to the AMF to trigger a PDU session creation for the 5G VN group.

At operation S3, the AMF sends an SMF discovery request message carrying information of the 5G VN group to the NF1 (i.e. the NF where the GMF is deployed alone), so as to start a process of selecting an SMF for PDU sessions of the 5G VN group.

At operation S4, the NF1 (i.e. the NF where the GMF is deployed alone) searches for a second mapping relationship between information of the VN group and information of the SMF to obtain the SMF set (i.e., SMF1, SMF2), and returns an SMF discovery response message carrying the SMF set to the AMF.

At operation S5, the AMF sends a VN group preferred SMF selection request message to the NF2 (i.e. the NF where the GPSSF is deployed alone) to initiate a 5G VN group preferred SMF selection request carrying the information of the 5G VN group and the SMF set.

At operation S6, the NF2 (i.e. the NF where the GPSSF is deployed alone) determines whether to select a preferred SMF for the 5G VN group for the first time according to a first mapping relationship between the information of the VN group and the information of the preferred SMF, in response to determining that the NF2 is to select the preferred SMF for the 5G VN group for the first time, the SMF1 is selected from the SMF set as the preferred SMF of the 5G VN group through a manner of being statically configured or dynamically selected, and the first mapping relationship between the information of the 5G VN group and the information of the SMF1 is locally established; in response to determining that the NF2 previously selected the preferred SMF for the 5G VN group, the information of the preferred SMF (i.e., SMF1) previously selected is acquired; the NF2 sends a VN group preferred SMF selection response message carrying the information of the preferred SMF (i.e., SMF1) to the AMF.

At operation S7, the AMF sends a PDU session creation request message to the preferred SMF1 (i.e., the preferred SMF of the 5G VN group).

At operation S8, the SMF1 returns a PDU session creation response message to the AMF.

At operation S9, in response to that the SMF1 returns a PDU session creation request failure message, the AMF determines whether to continue to select another SMF for the 5G VN group to continue to initiate the PDU session creation process based on a local strategy; if another SMF is to be selected to continue to initiate the PDU session creation process, another SMF is to be selected from the SMF set to be accessed, and the PDU session creation request message is to be sent to the selected SMF; if another SMF is not to be selected to continue to initiate the PDU session creation process, the PDU session is to be rejected.

Figure 8:
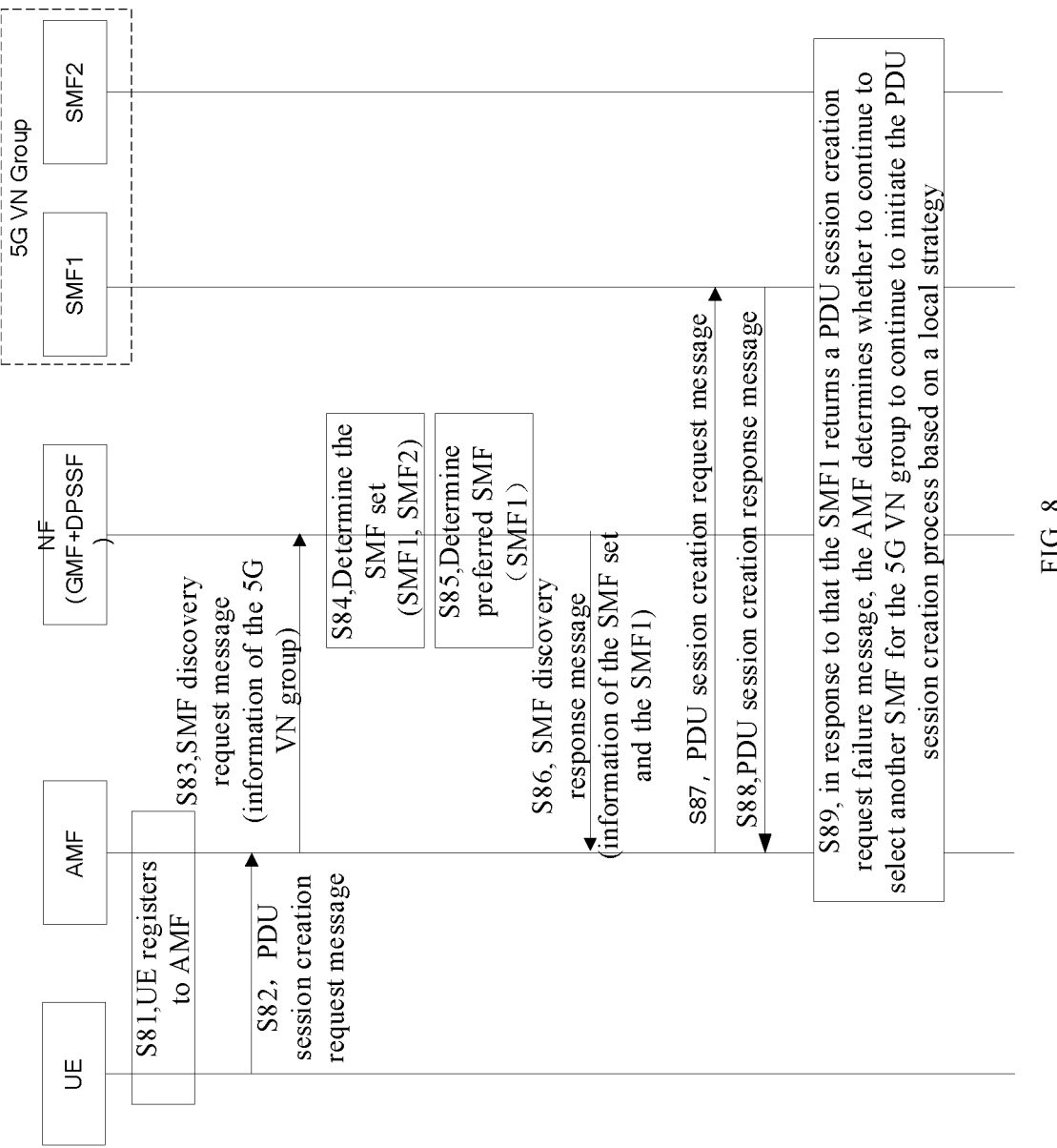
FIG. 8 is a flowchart of signaling in an SMF discovery method in a scenario where a GMF and a GPSSF are deployed in one NF according to the present disclosure.

An SMF discovery process in the case where both the GMF and the GPSSF are deployed in the NF is described in detail below by taking an example, in the example, the NF is that where both the GMF and the GPSSF are deployed, and the SMF set, corresponding to the 5G VN group that UE belongs to, includes SMF1 and SMF2. As shown in FIG. 8, the SMF discovery process includes following operations S81 to S89.

At operation S81, the UE registers to a 5G core network, i.e., the UE registers to the AMF.

At operation S82, the UE sends a PDU session creation request message to the AMF to trigger a PDU session creation for the 5G VN group.

At operation S83, the AMF sends an SMF discovery request message carrying information of the 5G VN group to the NF (i.e. the NF where the GMF and the GPSSF are deployed), so as to start a process of selecting an SMF for PDU sessions of the 5G VN group.

At operation S84, the NF (i.e. the NF where the GMF and the GPSSF are deployed) searches for a second mapping relationship between information of the VN group and information of the SMF to obtain the SMF set (i.e., SMF1, SMF2) corresponding to the 5G VN group.

At operation S85, the NF (i.e. the NF where the GMF and the GPSSF are deployed) determines whether to select a preferred SMF for the 5G VN group for the first time according to a first mapping relationship between the information of the VN group and information of the preferred SMF, in response to that the NF is to select the preferred SMF for the 5G VN group for the first time, the SMF1 is to be selected from the SMF set as the preferred SMF of the 5G VN group through a manner of being statically configured or dynamically selected, and the first mapping relationship between the information of the 5G VN group and the information of the SMF1 is locally established; in response to that the NF previously selected the preferred SMF for the 5G VN group, the information of the preferred SMF (i.e., SMF1) previously selected is acquired.

At operation S86, the NF (i.e. the NF where the GMF and the GPSSF are deployed) sends an SMF discovery response message carrying information of the SMF set and the SMF1 to the AMF.

At operation S87, the AMF sends a PDU session creation request message to the SMF1 (i.e., the preferred SMF).

At operation S88, the SMF1 returns a PDU session creation response message to the AMF.

At operation S89, in response to that the SMF1 returns a PDU session creation request failure message, the AMF determines whether to continue to select another SMF for the 5G VN group to continue to initiate the PDU session creation process based on a local strategy; if another SMF is to be selected to continue to initiate the PDU session creation process, another SMF is to be selected from the SMF set to be accessed, and a PDU session creation request message is sent to the selected SMF; if another SMF is not to be selected to continue to initiate the PDU session creation process, the PDU session is to be rejected.

A process of an SMF registering to an NF where a GMF is deployed is described in detail below by taking an example. FIG. 9 is a flowchart of signaling for an SMF registering to an NF (NF1) where a GMF is deployed according to the present disclosure. As shown in FIG. 9, a process of the SMF registering to the NF1 includes following operations S10 to S30.

At operation S10, the SMF sends a registration request message carrying information of a 5G VN group to the NF1.

At operation S20, the NF1 establishes a second mapping relationship between information of the 5G VN group and information of the SMF.

At operation S30, the NF1 returns a registration response message to the SMF.

The SMF discovery method provided in the embodiment of the present disclosure introduces a GMF logic entity for managing the information of the 5G VN group, with the GMF logic entity being independently used as the NF or used as a component of an existing NF, and further introduces a GPSSF logic entity for selecting the preferred SMF from a group of SMFs that the 5G VN group belongs to, with the GPSSF logic entity being independently used as the NF, or used as a component of the existing NF, or combined with the GMF in one NF.

Based on the same technical concept, an embodiment of the present disclosure further provides a network function node, as shown in FIG. 10, including a first processing module 101, an SMF discovery module 102, and a sending module 103.

The first processing module 101 is configured to, in response to receiving a first request message sent by an AMF, determine an SMF set including an SMF that a VN group belongs to, with the VN group including a UE accessing the AMF and requesting to create a session.

The SMF discovery module 102 is configured to determine the preferred SMF of the VN group from the SMF set.

The sending module 103 is configured to send information of the preferred SMF to the AMF.

In some implementations, the first processing module 101 is further configured to, after the first request message sent by the AMF is received, and before the preferred SMF of the VN group is determined, acquire information of the VN group carried in the first request message.

In some implementations, the SMF discovery module 102 is configured to, in response to that the preferred SMF corresponding to the information of the VN group is determined according to a first mapping relationship between the information of the VN group and the information of the preferred SMF, take the preferred SMF determined as the preferred SMF of the VN group.

In some implementations, the SMF discovery module 102 is further configured to, in response to that the preferred SMF corresponding to the information of the VN group is not determined according to the first mapping relationship between the information of the VN group and the information of the preferred SMF, select one SMF from the SMF set as the preferred SMF of the VN group.

In some implementations, the SMF discovery module 102 is configured to take the pre-designated SMF in the SMF set as the preferred SMF of the VN group, or randomly select one SMF from the SMF set as the preferred SMF of the VN group.

In some implementations, as shown in FIG. 11, the network function node further includes a second processing module 104 configured to, after the SMF discovery module 102 select one SMF from the SMF set as the preferred SMF of the VN group, establish the first mapping relationship between the information of the VN group and the information of the preferred SMF.

In some implementations, the first request message is an SMF discovery request message, and the first processing module 101 is further configured to acquire the information of the VN group carried in the SMF discovery request message; and determine the SMF set of the VN group according to the information of the VN group and a second mapping relationship between the information of the VN group and the information of the SMF.

In some implementations, the sending module 103 is configured to send an SMF discovery response message to the AMF, the SMF discovery response message carrying the information of the preferred SMF.

In some implementations, the first request message is a VN group preferred SMF selection request message, and the first processing module 101 is further configured to acquire the SMF set, carried in the VN group preferred SMF selection request message, determined by a GMF according to the information of the VN group carried in the SMF discovery request message sent by the AMF and the second mapping relationship between the information of the VN group and the information of the SMF, and sending the determined SMF set to the AMF.

In some implementations, the sending module 103 is configured to send a VN group preferred SMF selection response message carrying the information of the preferred SMF to the AMF.

In some implementations, as shown in FIG. 12, the network function node further includes a registration module 105 configured to, in response to receiving an SMF registration request message sent by the SMF, acquire the information of the VN group carried in the SMF registration request message; and establish the second mapping relationship between the information of the VN group and the information of the SMF.

Figure 13:
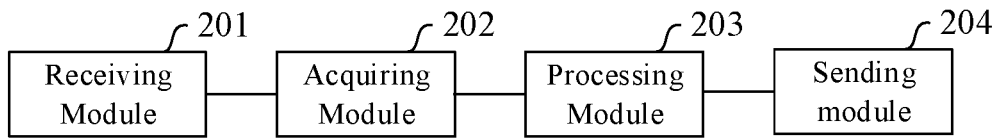
FIGS. 13 and 14 are schematic structural diagrams of NFs (deployed with a GMF) according to the present disclosure.

An embodiment of the present disclosure further provides a network function node, as shown in FIG. 13, including a receiving module 201, an acquiring module 202, a processing module 203, and a sending module 204.

The receiving module 201 is configured to receive an SMF discovery request message sent by an AMF.

The acquiring module 202 is configured to acquire information of a VN group carried in the SMF discovery request message.

The processing module 203 is configured to determine an SMF set of the VN group according to the information of the VN group and a second mapping relationship between the information of the VN group and information of an SMF.

The sending module 204 is configured to send an SMF discovery response message carrying the SMF set to the AMF, so that the AMF initiates a preferred SMF selection request.

Figure 14:
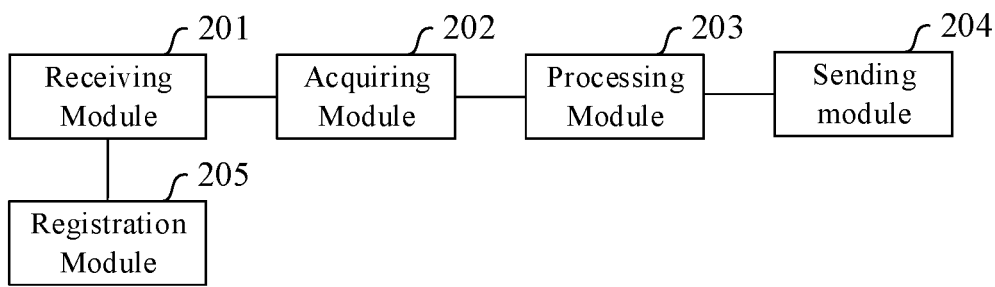

In some implementations, as shown in FIG. 14, the network function node further includes a registration module 205 configured to, in response to receiving an SMF registration request message sent by the SMF, acquire the information of the VN group carried in the SMF registration request message; and establish the second mapping relationship between the information of the VN group and the information of the SMF.

Figure 15:
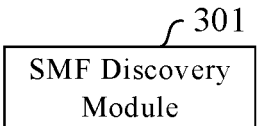
FIGS. 15 and 16 are schematic structural diagrams of AMFs according to the present disclosure.

An embodiment of the present disclosure further provides an AMF, as shown in FIG. 15, including an SMF discovery module 301 configured to, in response to receiving a session creation request message sent by a UE, send a first request message to an NF, the first request message being configured to instruct the NF to determine a preferred SMF of a VN group that the UE belongs to from the SMF set, with the VN group belonging to the SMF in the SMF set; and receive information of the preferred SMF sent by the NF, send a session creation request message to the preferred SMF corresponding to the information of the preferred SMF.

Figure 16:
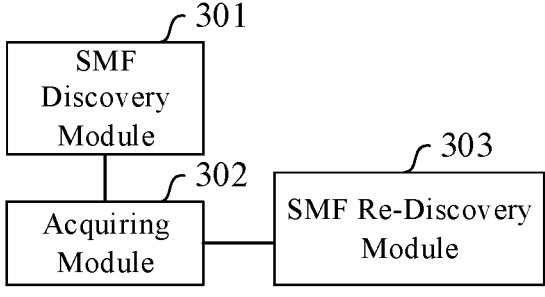

In some implementations, as shown in FIG. 16, the AMF further includes an acquiring module 302 configured to, before sending the session creation request message to the preferred SMF corresponding to the information of the preferred SMF, acquire the SMF set.

The AMF further includes an SMF re-discovery module 303 configured to, after the SMF discovery module 301 send the session creation request message to the preferred SMF corresponding to the information of the preferred SMF, in response to receiving a session creation request failure message sent by the preferred SMF, select another SMF from the SMF set except the preferred SMF, and send the session creation request message to the selected SMF.

In some implementations, the first request message is an SMF discovery request message carrying the information of the VN group that the UE belongs to, the acquiring module 302 is configured to acquire the information of the preferred SMF and the SMF set carried in the SMF discovery response message sent by the NF, the SMF set is determined by the NF according to the information of the VN group and a second mapping relationship between the information of the VN group and the information of the SMF.

In some implementations, the NF includes a first NF and a second NF, the first request message is a VN group preferred SMF selection request message, the acquiring module 302 is configured to send the SMF discovery request message carrying the information of the VN group to the first NF, the SMF discovery request message being configured to instruct the first NF to determine the SMF set; and receive an SMF discovery response message sent by the first NF, and acquire the SMF set carried in the SMF discovery response message.

The SMF discovery module 301 is configured to send the VN group preferred SMF selection request message carrying the SMF set to the second NF, the VN group preferred SMF selection request message being configured to instruct the second NF to determine the preferred SMF of the VN group.

In some implementations, the VN group preferred SMF selection request message further carries the information of the VN group.

An embodiment of the present disclosure further provides an electronic device, including: at least one processor; and a storage device having at least one computer program stored thereon, the at least one computer program, executed by the at least one processor, causes the at least one processor to implement the SMF discovery method described above.

An embodiment of the present disclosure further provides a computer-readable storage medium having a computer program stored thereon, the computer program, executed by a processor, causes the processor to perform the SMF discovery method described above.

It should be understood by those of ordinary skill in the art that all or some of the operations in the method, the functional modules/components in the apparatuses disclosed above may be implemented as software, firmware, hardware, or suitable combinations thereof. In a hardware implementation, the division between the functional modules/components stated above does not correspond to the division of physical components; for example, one physical component may have a plurality of functions, or one function or operation may be performed through a cooperation of several physical components. A part or all of the physical components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium, the computer-readable medium may include computer storage medium (or non-transitory medium) and communication medium (or transitory medium). The computer storage medium includes volatile/nonvolatile or removable/non-removable medium implemented in any method or technology for storing information (such as computer-readable instructions, data structures, program modules and other data). The computer storage medium includes, but is not limited to, a Random Access Memory (RAM), a Read-Only Memory (ROM), an Electrically Erasable Programmable Read-Only Memory (EEPROM), a flash memory or other storage device techniques, a Compact Disc Read-Only Memory (CD-ROM), a Digital Video Disk (DVD) or other optical discs, magnetic cassettes, magnetic tapes, magnetic disks or other magnetic storage devices, or any other medium which can be used to store the desired information and can be accessed by a computer. The communication medium generally includes computer-readable instructions, data structures, program modules or other data in a modulated data signal, such as a carrier wave or other transmission mechanism, and may include any information delivery medium.

The present disclosure discloses the exemplary implementations, and although specific terms are employed, they are used and should only be interpreted in a generic and descriptive meaning but not for purposes of a limitation. It is apparent to those skilled in the art that features, characteristics and/or elements described in connection with specific implementations may be used alone or in combination with features, characteristics and/or elements described in connection with other implementations, unless explicitly stated otherwise. Therefore, it should be understood by those skilled in the art that various changes in form and details may be made without departing from the scope of the present disclosure as set forth in the appended claims.

What is claimed is:

1. A session management function entity discovery method, performed by an access and mobility management function entity (AMF), comprising:

in response to receiving a session creation request message sent by a user equipment (UE) in a virtual network (VN) group including a plurality of UEs, sending a first request message to a network function node (NF), the first request message being configured to instruct the NF to determine a preferred session management function entity (SMF) of the virtual network (VN) group from an SMF set including a plurality of SMFs, the VN group, including the plurality of UEs, belonging to the plurality of SMFs in the SMF set;

receiving information of the preferred SMF sent by the NF;

sending a session creation request message to the preferred SMF corresponding to the information of the preferred SMF, in response to a session creation request message sent by any UE in the VN group; and selecting another SMF from the SMF set except the preferred SMF and sending the session creation request message to the another SMF, in response to receiving a session creation request failure message sent by the preferred SMF.

2. The method of claim 1, further comprising:

before sending the session creation request message to the preferred SMF corresponding to the information of the preferred SMF, acquiring the SMF set.

3. The method of claim 2, wherein the first request message is an SMF discovery request message carrying information of the VN group that the UE belongs to, and the receiving information of the preferred SMF sent by the NF and the acquiring the SMF set comprise:

receiving an SMF discovery response message sent by the NF, and acquiring the information of the preferred SMF and the SMF set carried in the SMF discovery response message, the SMF set being determined by the NF according to the information of the VN group and a second mapping relationship between the information of the VN group and information of the SMF.

4. The method of claim 1, wherein the NF comprises a first NF and a second NF, the first request message is a VN group preferred SMF selection request message, the SMF discovery method further comprises:

before sending the first request message to the NF, sending an SMF discovery request message carrying the information of the VN group to the first NF, the SMF discovery request message being configured to instruct the first NF to determine the SMF set; and receiving an SMF discovery response message sent by the first NF, and acquiring the SMF set carried in the SMF discovery response message;

the sending a first request message to an NF comprises:

sending the VN group preferred SMF selection request message carrying the SMF set to the second NF, the VN group preferred SMF selection request message being configured to instruct the second NF to determine the preferred SMF of the VN group.

5. The method of claim 4, wherein the VN group preferred SMF selection request message further carries the information of the VN group.

6. The method of claim 2, wherein the NF comprises a first NF and a second NF, the first request message is a VN group preferred SMF selection request message, the SMF discovery method further comprises:

before sending the first request message to the NF, sending an SMF discovery request message carrying the information of the VN group to the first NF, the SMF discovery request message being configured to instruct the first NF to determine the SMF set; and receiving an SMF discovery response message sent by the first NF, and acquiring the SMF set carried in the SMF discovery response message;

the sending a first request message to an NF comprises:

sending the VN group preferred SMF selection request message carrying the SMF set to the second NF, the VN group preferred SMF selection request message being configured to instruct the second NF to determine the preferred SMF of the VN group.

7. An electronic device, comprising:

at least one processor; and a storage device having at least one computer program stored thereon; the at least one computer program, executed by the at least one processor, causes the at least one processor to implement the SMF discovery method of claim 1.

8. A non-transitory computer-readable storage medium having a computer program stored thereon, the computer program, executed by a processor, causes the processor to perform the SMF discovery method according to claim 1.

* * * * *